United States Patent
Yasuda et al.

(10) Patent No.: US 12,281,701 B2
(45) Date of Patent: Apr. 22, 2025

(54) TRANSMISSION AND METHOD FOR PRODUCING TRANSMISSION

(71) Applicant: Kubota Corporation, Osaka (JP)

(72) Inventors: Toshifumi Yasuda, Sakai (JP); Jun Yoshida, Sakai (JP); Yusuke Morita, Sakai (JP); Akihiro Takami, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/128,651

(22) Filed: Mar. 30, 2023

(65) Prior Publication Data

US 2023/0323947 A1 Oct. 12, 2023

(30) Foreign Application Priority Data

Apr. 11, 2022 (JP) ................. 2022-065180

(51) Int. Cl.
*F16H 59/10* (2006.01)
*F16H 63/18* (2006.01)

(52) U.S. Cl.
CPC ............ *F16H 63/18* (2013.01); *F16H 59/10* (2013.01)

(58) Field of Classification Search
CPC ................................ F16H 63/18; F16H 59/10
USPC ........................................................ 74/473.3
See application file for complete search history.

(56) References Cited

U.S. PATENT DOCUMENTS

| | | | |
|---|---|---|---|
| 8,007,403 B2 * | 8/2011 | Ishida | F16H 61/448 477/68 |
| 2016/0312866 A1 * | 10/2016 | Zink | F16H 63/18 |
| 2022/0163111 A1 * | 5/2022 | Nishimoto | F16H 63/3466 |
| 2022/0381339 A1 * | 12/2022 | Hendrickx | F16H 63/18 |
| 2022/0412457 A1 * | 12/2022 | Nakanishi | F16H 63/304 |

FOREIGN PATENT DOCUMENTS

| | | | |
|---|---|---|---|
| DE | 102014104569 A1 * | 10/2015 | ........... F16H 53/025 |
| GB | 1165993 A * | 1/1967 | |
| JP | 517505 Y2 | 5/1993 | |
| JP | 200035103 A | 2/2000 | |
| JP | 200127320 A | 1/2001 | |
| JP | 2007139170 A | 6/2007 | |

* cited by examiner

*Primary Examiner* — T. Scott Fix
(74) *Attorney, Agent, or Firm* — The Webb Law Firm (57) ABSTRACT

A transmission includes a speed change gearbox including gears configured to be switched by a movement of a shifter having a cam pin in a guide groove and configured to be moved by a movement of the cam pin following the rotation of a shift drum. The guide groove includes a bent section having an inner wall on an inner side that is formed by (i) first end mill machining performed in a direction in which the guide groove extends; and (ii) second end mill machining performed in the direction in which the guide groove extends, in such a manner as to increase a curvature radius of the inner wall on the inner side formed by the first end mill machining.

2 Claims, 5 Drawing Sheets

TRANSMISSION AND METHOD FOR PRODUCING TRANSMISSION

CROSS-REFERENCE TO RELATED APPLICATION

This application claims priority to Japanese Patent Application No. 2022-065180 filed Apr. 11, 2022, the disclosure of which is hereby incorporated by reference in its entirety.

BACKGROUND OF THE INVENTION

Field of the Invention

The present invention relates to a transmission that switches gears with use of a shift drum, and a method for producing a transmission.

Description of Related Art

A transmission disclosed in JP 2001-027320A includes a shift drum that is fit onto an operation shaft that rotates in conjunction with an operation of an operation tool for gear change. Coupling pins (cam pins) of shifters are inserted into guide grooves provided for boss sections of the shift drum. To switch gears, the shift drum is rotated to displace the shifters, thereby switching gears. Each cam hole extends while being bent in a shape appropriate for switching gears. A transmission disclosed in JP 2007-139170A includes movable members (integrated members of shift drums and shift forks) movably fitted onto operation shafts that rotate in conjunction with an operation of an operation tool for gear change. Coupling pins (cam pins) inserted into cam holes (guide grooves) in boss sections of the movable members are fixed to the operation shafts. To switch gears, an operation shaft is rotated to move the movable member, thereby switching gears. Each cam hole of JP 2007-139170A also extends while being bent in a shape appropriate for switching gears, similarly to the guide groove of JP 2001-027320A.

SUMMARY OF THE INVENTION

Each guide groove is formed in a surface of a cam pin shift drum of a shifter in such a manner to have a fixed width through a circumferential machining process of an end mill. Quicker shifter movement in gear switching control allows quicker switching gears. To achieve this, the bending angle of the bent portion of each guide groove needs to be steeper. A steeper bending angle of the bent portion may cause a locking state between contact points of the cam pin and inner and outer peripheral walls of the guide groove and a gear change action point of the shifter in response to the cam pin tilting relative to the guide groove. This may result in an incorrect gear changing operation.

In view of the foregoing circumstances, the present invention aims to provide a transmission for a traveling vehicle in which a cam pin of a shifter can smoothly move along a guide groove in a shift drum.

A transmission for a traveling vehicle according to the present invention includes: a gear change operation tool; a shift drum configured to rotate in response to an operation of the gear change operation tool and having at least one bent guide groove disposed in a surface of the shift drum and extending in a circumferential direction of the surface of the shift drum; at least one shifter having a cam pin in the at least one guide groove, and configured to be moved by a movement of the cam pin following the rotation of the shift drum; and a speed change gearbox including gears configured to be switched by the movement of the shifter, wherein the at least one guide groove includes a bent section having an inner wall on an inner side that is formed by: (i) first end mill machining performed in a direction in which the at least one guide groove extends; and (ii) second end mill machining performed in the direction in which the at least one guide groove extends, in such a manner as to increase a curvature radius of the inner wall on the inner side formed by the first end mill machining.

According to this configuration, the curvature radius of the inner wall on the inner side is expanded, and this curvature radius indicates the degree of bending of the inner wall on the inner side of the bent section (inflecting section) of the guide groove where a locking state is likely to occur between the cam pin, the peripheral wall on the inner side and outer side of the guide groove, and a gear change action point of the shifter. The locking state is thus avoided. This can optimize the movement of the shifter during gear switching control, thus realizing favorable switching of the gear.

The guide groove in the surface of the shift drum is formed to have a fixed width through the circumferential machining process with use of an end mill. In the bent section of the guide groove, the curvature radius of the inner wall on the inner side, which is a peripheral wall on the bending center side, is smaller than the curvature radius of the inner wall on the outer side. There is a possibility that this causes the inner wall on the inner side to act as a protrusion in the guide groove and causes the aforementioned locking state. For this reason, the inner wall on the inner side is machined by the end mill in such a manner that the curvature radius of the inner wall on the inner side is closer to the curvature radius of the inner wall on the outer side. Here, excessive end mill machining increases the burden of machining work. Moreover, an excessively increased curvature radius of the inner wall on the inner side leads to insufficient guiding of the cam pin and causes a shake of the cam pin. An appropriate ratio between a preferable curvature radius of the inner wall on the outer side and the curvature radius of the inner wall on the inner side was obtained experimentally. That is, in a preferable embodiment of the present invention, the ratio between the curvature radius of the inner wall on the outer side and the curvature radius of the inner wall on the inner side of the bent section is 2 or less, preferably 1.9 or less. For example, if the curvature radius of the inner wall on the outer side is 11 mm, it is preferable that the second end mill machining is performed in such a manner that the curvature radius of the inner wall on the inner side is 5.5 to 7 mm, preferably 6 mm, i.e. the ratio between the curvature radius of the inner wall on the outer side and the curvature radius of the inner wall on the inner side is about 2 to 1.5. For this reason, in a preferable embodiment of the present invention, the ratio between the curvature radius of the inner wall on the outer side and the curvature radius of the inner wall on the inner side of the bent section is 1.9 or less.

In a preferable embodiment of the present invention, the at least one shifter includes a first shifter and a second shifter, the at least one guide groove includes a first guide groove in which a cam pin of the first shifter is disposed, and a second guide groove in which a cam pin of the second shifter is disposed, and the gears of the speed change gearbox are switched due to positions of the first shifter and the second shifter being determined by a rotation angle of the shift drum.

A method for producing a transmission according to the present invention is a method for producing a transmission for a traveling vehicle that includes: a shift drum configured to rotate in response to an operation of a gear change operation tool and having a bent guide groove disposed in a surface of the shift drum and extending in a circumferential direction of the surface of the shift drum; a shifter having a cam pin in the guide groove and configured to be moved by a movement of the cam pin following the rotation of the shift drum; and a speed change gearbox including gears configured to be switched by the movement of the shifter, the method comprising: a first end mill machining step of performing end mill machining in a direction in which the guide groove extends, on an inner wall on an inner side of a bent section of the guide groove; and a second end mill machining step of performing end mill machining in the direction in which the guide groove extends, in such a manner as to increase a curvature radius of the inner wall on the inner side formed in the first end mill machining step.

In a preferable embodiment of the present invention, in the second end mill machining step, end mill machining is performed in such a manner that a ratio between a curvature radius of an inner wall on an outer side and a curvature radius of the inner wall on the inner side of the bent section is 2 or less.

DESCRIPTION OF THE INVENTION

Note that in the present specification, the term "front" means the front side in the front-rear direction of the body of a multipurpose vehicle (traveling direction), and the term "rear" means the rear side in the front-rear direction of the body of the multipurpose vehicle (traveling direction), unless stated otherwise. Also, the left-right direction and the lateral direction mean the transverse direction of the body of the multipurpose vehicle (body-width direction) that is orthogonal to the front-rear direction of the body. The terms "up" and "down" refer to a positional relationship in the vertical direction of the body of the multipurpose vehicle, and indicate a positional relationship based on the ground height.

An example embodiment of the present invention will be described below with reference to the drawings.

Figure 1:
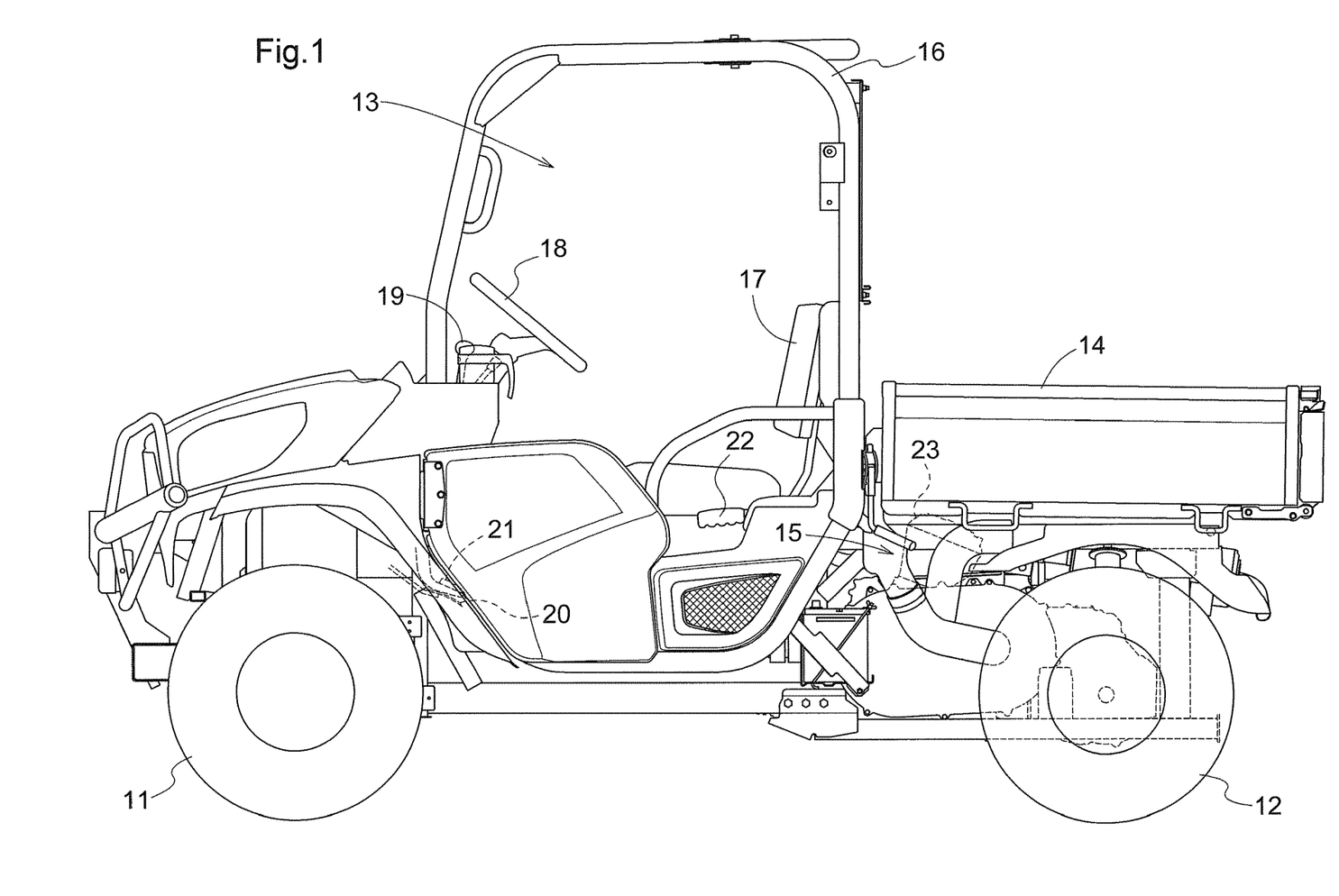
FIG. 1 is a side view of an entire multipurpose vehicle.

A multipurpose vehicle (an example of a "traveling vehicle") shown in FIG. 1 is configured as a vehicle that can be used for multiple purposes, such as transportation of loads and recreation. The multipurpose vehicle includes a pair of left and right front wheels 11 as a drivable and steerable traveling device, and a pair of left and right rear wheels 12 as a drivable traveling device. That is, a traveling body of the multipurpose vehicle can travel with use of the pair of left and right front wheels 11 and the pair of left and right rear wheels 12. The traveling body has, at its center, a driving section 13 in which an operator sits and perform driving operation. The traveling body has, in its rear section, a carrier 14 on which loads are mountable. The multipurpose vehicle has a motor section 15 below the carrier 14.

The driving section 13 is surrounded and protected by a ROPS frame 16 having a frame shape. The driving section 13 includes a driving seat 17 for the operator to sit on. The driving section 13 also includes a steering wheel 18 for steering the left and right front wheels 11, a gear change operation tool 19 for gear change operation that is configured as a gear shift lever, an accelerator pedal 20 for changing traveling speed, a brake pedal 21 for braking the traveling body, a parking brake lever 22 for parking-brake operation, and other members. The motor section 15 includes a water-cooled gasoline engine (an example of an "engine"; hereinafter abbreviated as an engine 23).

Figure 2:
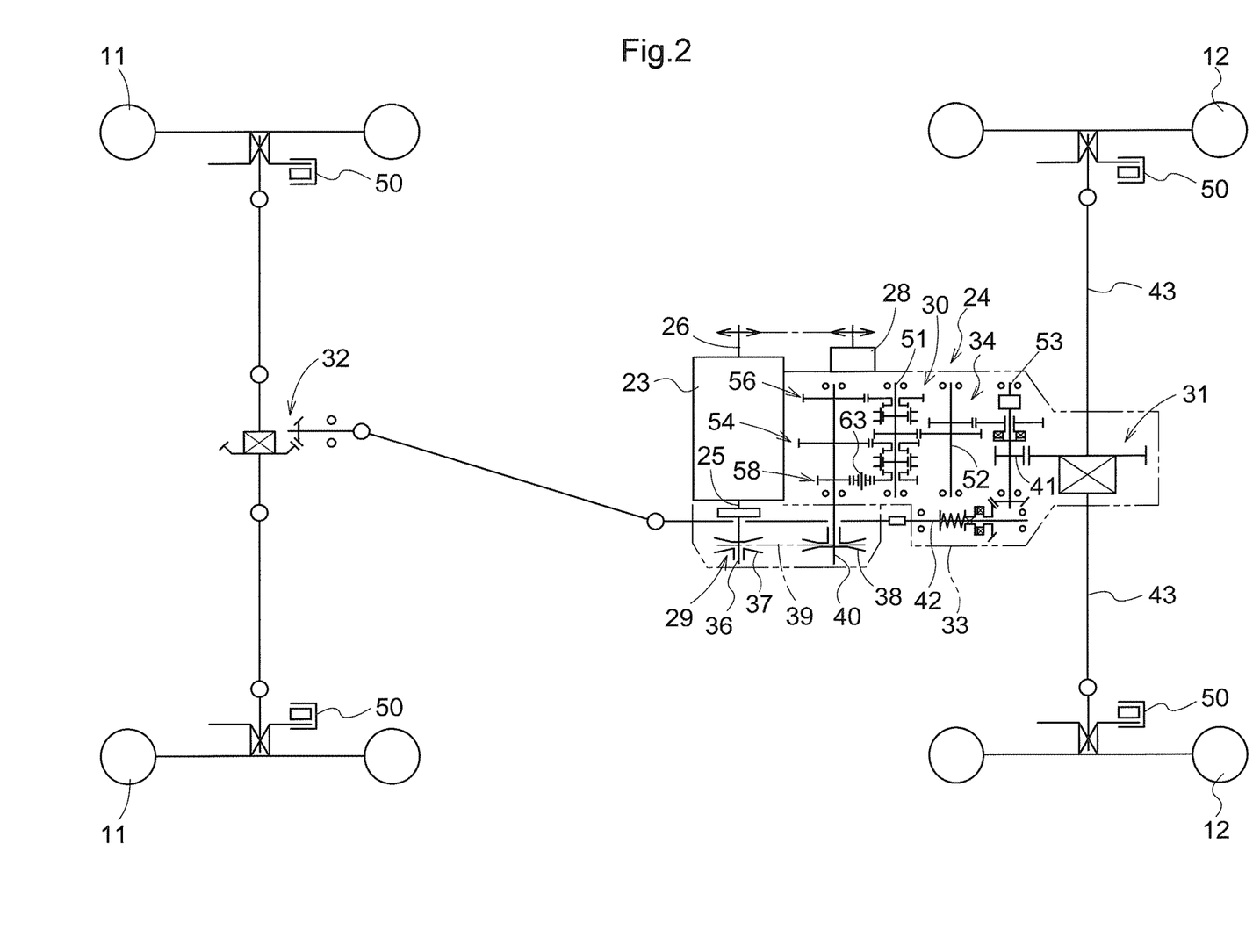
FIG. 2 is a schematic plan view of a powertrain of the multipurpose vehicle.

FIG. 2 shows a powertrain of the multipurpose vehicle. The powertrain includes the engine 23, a belt-type continuously variable mechanism 29, and a non-synchronous transmission 24, which is a gearbox. Motive power from the engine 23 is subjected to speed change by the belt-type continuously variable mechanism 29 and the transmission 24 and is transmitted to the traveling devices.

The engine 23 is disposed with a crankshaft oriented in the lateral direction of the body of the vehicle, as shown in FIG. 2. The engine 23 includes a main output shaft 25 integrated with the crankshaft, and an auxiliary output shaft 26 integrated with the crankshaft. The output of the main output shaft 25 is input to the belt-type continuously variable mechanism 29. The output of the auxiliary output shaft 26 drives an electric power generator 28, which includes an alternator and other members.

The transmission 24, to which the output of the belt-type continuously variable mechanism 29 is input, includes a speed change gearbox 30, a rear-wheel differential mechanism 31 capable of making a speed difference between the left and right rear wheels 12, a front-wheel differential mechanism 32 capable of making a speed difference between the left and right front wheels 11, a relay transfer device 34 for transferring the output from the speed change gearbox 30 to the rear-wheel differential mechanism 31 and the front-wheel differential mechanism 32, and other members.

The belt-type continuously variable mechanism 29 includes a drive pulley 37 attached to a drive shaft 36 that can be joined to the main output shaft 25 of the engine 23 in an interlocking manner via a centrifugal clutch, a driven pulley 38 located rearward of the drive pulley 37, and an endless belt 39 wound around the drive pulley 37 and the driven pulley 38.

The belt-type continuously variable mechanism 29 can steplessly shift motive power of the engine 23 and output it to the speed change gearbox 30 due to the winding diameters of the drive pulley 37 and the driven pulley 38 changing in response to the engine speed of the engine 23.

The speed change gearbox 30 can receive the input of motive power of the belt-type continuously variable mechanism 29 from an input shaft 40 that integrally rotates with the driven pulley 38, shift the motive power input from the input shaft 40, and output the motive power to a final gear 41, which is joined to the rear wheel 12 side in an interlocking manner, and a motive power takeoff shaft 42, which is joined to the front wheel 11 side in an interlocking manner.

The rear-wheel differential mechanism 31 outputs motive power input from the final gear 41 to the left and right rear wheels 12 via a rear-wheel drive shaft 43, which extends in the left-right direction of the body of the vehicle.

Each of the left and right front wheels 11 and the left and right rear wheels 12 has a brake device 50, which includes a disc brake mechanism. Each brake device 50 is joined to the brake pedal 21 (see FIG. 1) in an interlocking manner via a master cylinder (not shown).

Figure 3:
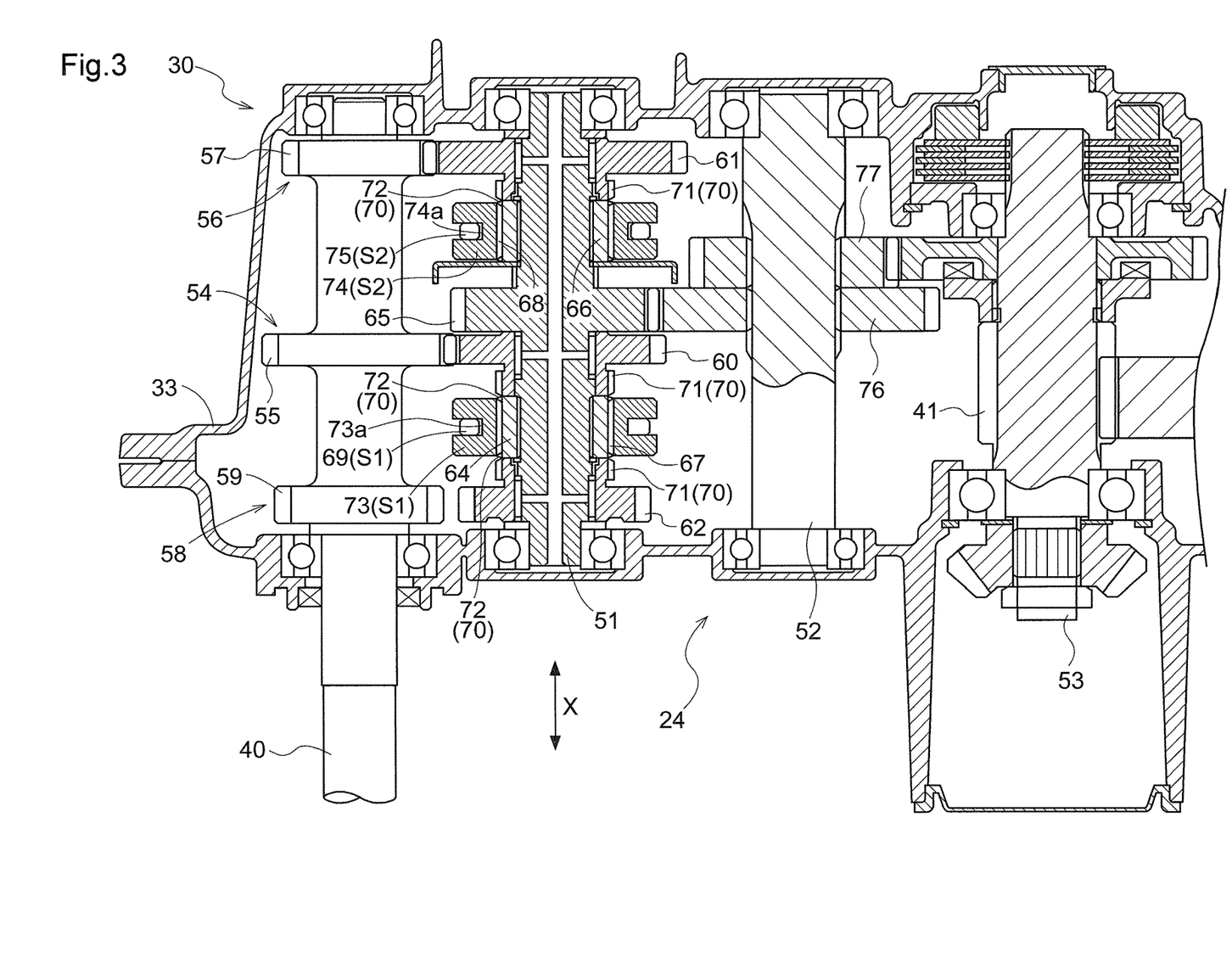
FIG. 3 is a plan view of a speed change gearbox.

The speed change gearbox 30 includes the input shaft 40, a variable speed shaft 51, a relay shaft 52, and a transfer shaft 53 as shafts for transferring motive power, as shown in FIGS. 2 and 3. The input shaft 40, the variable speed shaft 51, the relay shaft 52, and the transfer shaft 53 are rotatably supported within a transmission case 33.

The input shaft 40 is fixed to and supports a forward first-speed drive gear 55 of a forward first-speed gear mechanism 54, a forward second-speed drive gear 57 of a forward second-speed gear mechanism 56, and a reverse drive gear 59 of a reverse gear mechanism 58 in such a manner that these gears integrally rotate with the input shaft 40.

The variable speed shaft 51 supports a forward first-speed driven gear 60, which constitutes a gear of the forward first-speed gear mechanism 54, a forward second-speed driven gear 61, which constitutes a gear of the forward second-speed gear mechanism 56, and a reverse driven gear 62, which constitutes a gear of the reverse gear mechanism 58, in such a manner that these gears can relatively rotate with respect to each other, as shown in FIG. 3. The forward first-speed driven gear 60 constantly meshes with the forward first-speed drive gear 55. The forward second-speed driven gear 61 constantly meshes with the forward second-speed drive gear 57. The reverse driven gear 62 constantly meshes with the reverse drive gear 59 via a back gear 63 (see FIG. 2).

The variable speed shaft 51 is fixed to and supports a cylindrical first boss member 64 between the forward first-speed driven gear 60 and the reverse driven gear 62 in such a manner that the first boss member 64 integrally rotates with the variable speed shaft 51. The variable speed shaft 51 is fixed to and supports a first transfer gear 65 in such a manner that the first transfer gear 65 integrally rotates with the variable speed shaft 51. The variable speed shaft 51 is fixed to and supports a cylindrical second boss member 66 between the first transfer gear 65 and the forward second-speed driven gear 61 in such a manner that the second boss member 66 integrally rotates with the variable speed shaft 51.

A first constant-mesh spline 67 having a plurality of outer teeth in a circumferential direction is provided at the periphery of the first boss member 64. A second constant-mesh spline 68 having a plurality of outer teeth in a circumferential direction is provided at the periphery of the second boss member 66.

A plurality of (e.g. three) spline mechanisms 70 are provided on the variable speed shaft 51. The spline mechanisms 70 are provided for the respective gear mechanisms 54, 56, and 58. Each of the spline mechanisms 70 includes an external spline 71 and an internal spline 72 configured to mesh with the external spline 71.

The gears of the speed change gearbox 30 are switched with use of shifters, each of which includes shift sleeves 73 and 74 and shift forks 69 and 75. Fork portions 69*b* and 75*b* of the shift forks 69 and 75 are held in central grooves 73*a* and 74*a* extending in circumferential faces of the shift sleeves 73 and 74, and are integrally movable. This embodiment uses two shifters, i.e. a first shifter S1 and a second shifter S2. The first shifter S1 includes a first shift fork 69 and a first shift sleeve 73, and the second shifter S2 includes a second shift fork 75 and a second shift sleeve 74.

Specifically, the spline mechanism 70 of the forward first-speed gear mechanism 54 includes an external spline 71 of the forward first-speed driven gear 60, and an internal spline 72 on one end side of the first shift sleeve 73 that is configured to mesh with the external spline 71 of the forward first-speed driven gear 60. The spline mechanism 70 of the reverse gear mechanism 58 includes an external spline 71 of the reverse driven gear 62, and an internal spline 72 on the other end side of the first shift sleeve 73 that is configured to mesh with the external spline 71 of the reverse driven gear 62. The spline mechanism 70 of the forward second-speed gear mechanism 56 includes an external spline 71 of the forward second-speed driven gear 61, and an internal spline 72 on one end side of the second shift sleeve 74 that is configured to mesh with the external spline 71 of the forward second-speed driven gear 61.

The internal spline 72 of the first shift sleeve 73 constantly meshes with the first constant-mesh spline 67 of the first boss member 64. The first shift sleeve 73 can be slid in an axial direction X of the variable speed shaft 51 by the first shift fork 69 that is joined to the gear change operation tool 19 in an interlocking manner. This enables the internal spline 72 of the first shift sleeve 73 to mesh with the external spline 71 of the forward first-speed driven gear 60 or the external spline 71 of the reverse driven gear 62.

The internal spline 72 of the second shift sleeve 74 constantly meshes with the second constant-mesh spline 68 of the second boss member 66. The second shift sleeve 74 can be slid in the axial direction X of the variable speed shaft 51 by the second shift fork 75 that is joined to the gear change operation tool 19 in an interlocking manner. This enables the internal spline 72 of the second shift sleeve 74 to mesh with the external spline 71 of the forward second-speed driven gear 61.

The relay shaft 52 is fixed to and supports a first transferred gear 76 that constantly meshes with the first transfer gear 65, and a second transfer gear 77 in such a manner that these gears integrally rotate with the relay shaft 52.

Figure 4:
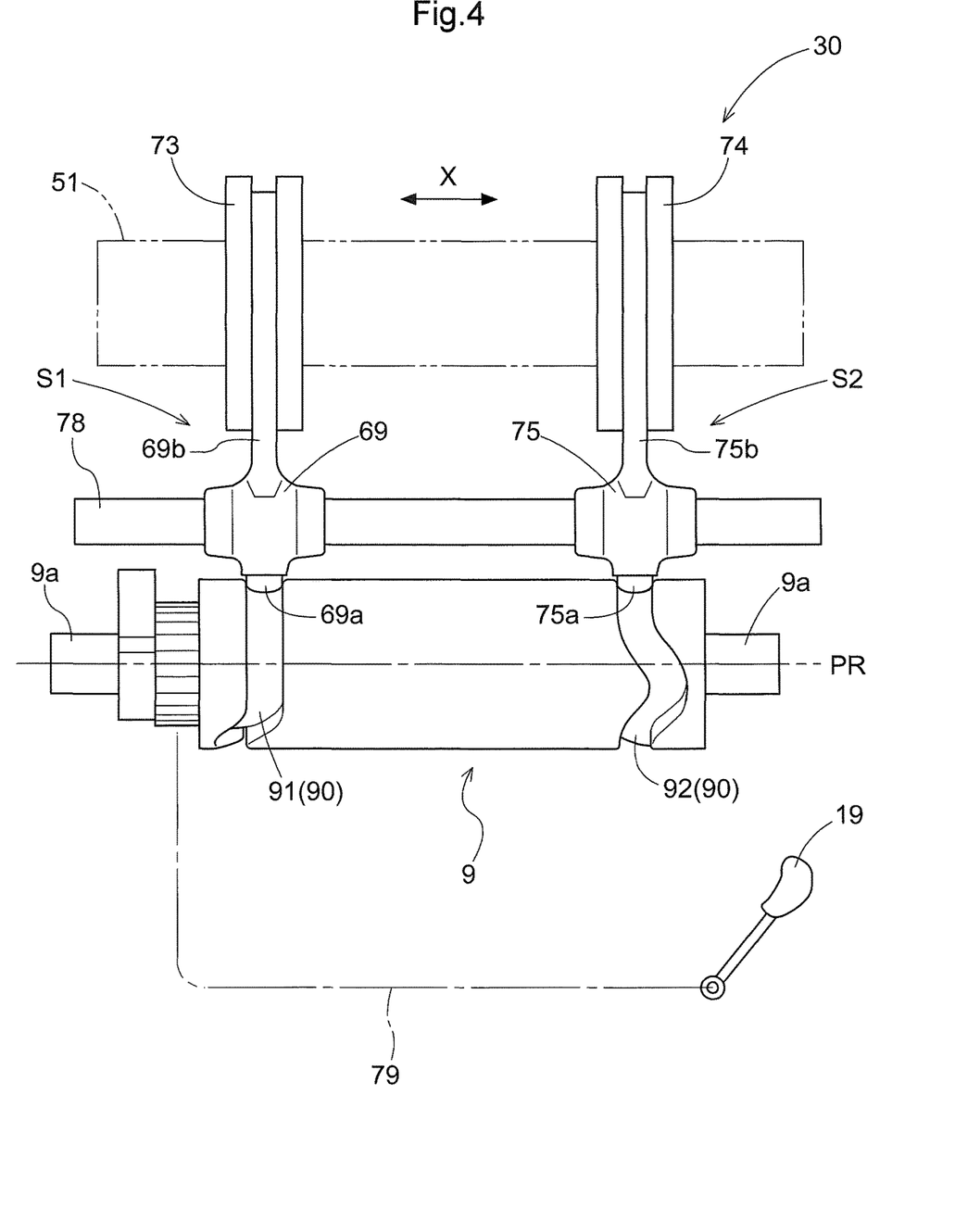
FIG. 4 is a plan view of shifters and a shift drum.

The first shift fork 69 and the second shift fork 75 are fitted onto a common sliding shaft 78, as shown in FIG. 4. The first shift fork 69 and the second shift fork 75 are slidably supported in the axial direction X by the sliding shaft 78 and the variable speed shaft 51. The gears of the speed change gearbox 30 are switched by the first shift fork 69 and the second shift fork 75 moving in the axial direction X in response to an operation of the gear change operation tool 19.

FIG. 4 shows a shift drum 9 that moves the first shifter S1 and the second shifter S2. The shift drum 9 has shafts 9*a* at both ends, and is rotatably supported about a rotation axis PR by the transmission case 33. The shift drum 9 is joined to the gear change operation tool 19 in an interlocking manner via an interlocking mechanism 79, and rotates in response to an operation of the gear change operation tool 19, thereby switching the gears of the speed change gearbox 30.

Figure 5:
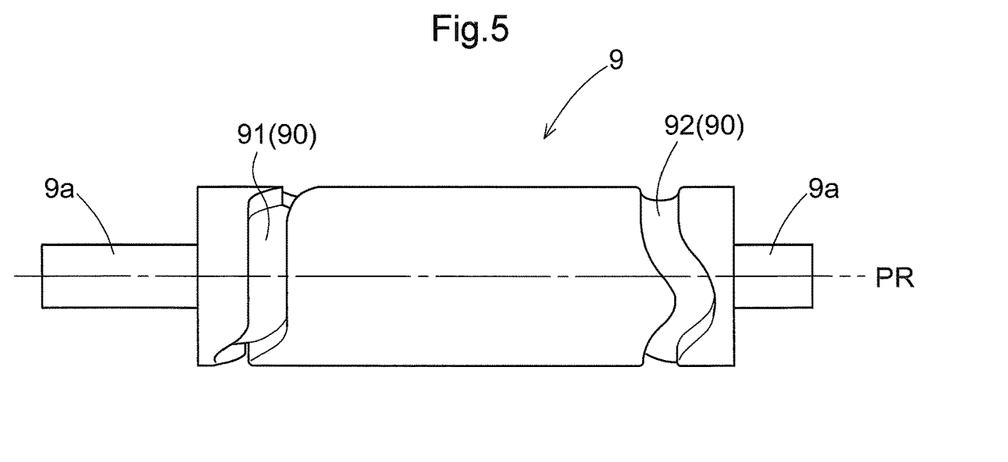
FIG. 5 is a plan view of the shift drum.

The shift drum 9 is a cylindrical body, and has, in its surface, two guide grooves 90, namely a first guide groove 91 and a second guide groove 92 that extend in the circumferential direction, as shown in FIG. 5. A cam pin 69*a* of the first shift fork 69 is inserted into the first guide groove 91, and a cam pin 75*a* of the second shift fork 75 is inserted into the second guide groove 92.

Figure 6:
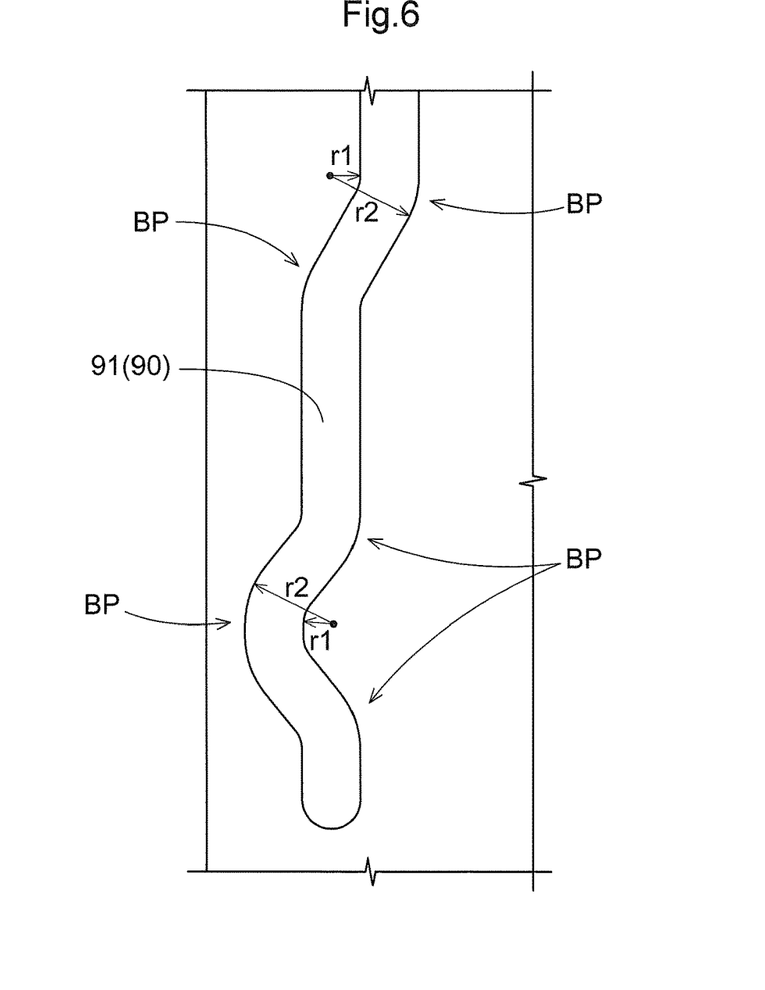
FIG. 6 is a developed view of a guide groove in a surface of the shift drum.

FIG. 6 is a developed view of the guide groove 90. Each guide groove 90 extends in the circumferential direction while being biased to the left and right in the direction of the rotation axis PR, and resultantly draws a bent line. The shapes of bent portions BP of the guide grooves 90 move the shifters (first shifter S1 and second shifter S2) in the axial direction X. That is, the rotation angle of the shift drum 9 determines the positions of the shifters, and the gears are switched.

The guide grooves 90 are formed by machining with use of an end mill. During end mill machining, the end mill and the shift drum 9 are relatively fed with respect to each other in the extension direction of a virtual guide groove to be formed. An end mill having a diameter corresponding to the width of each guide groove 90 is used in machining for forming the guide groove 90, and a bent guide groove 90 is formed by a combination of lateral feed of the end mill and rotation of the shift drum 9. During this end mill machining (first end mill machining), the machining path of an inner portion of the end mill near the bending center is shorter than the machining path of an outer portion of the end mill distant from the bending center in a bent section (peripheral section of a bending point) of each bent portion BP. In other words, the outer portion of the end mill makes a large turn while the inner portion of the end mill makes a small turn. Thus, in the path on the outer side of the bending center, the curvature radius (denoted by "r1" in FIG. 6) of an inner wall on the inner side, which is a peripheral wall on the bending center side is smaller than the curvature radius (denoted by "r2" in FIG. 6) of an inner wall on the outer side thereof. In this state, the inner wall on the inner side acts as a protrusion in the guide groove 90 and prevents the cam pins 69a and 75a from smoothly passing in the guide groove 90. This causes a locking state of the shifter that occurs between contact points of the cam pins 69a and 75a and the peripheral wall on the outer side of each bent portion BP, contact points of the cam pins 69a and 75a and the peripheral wall on the inner side of the bent portion BP, and contact points of the fork portions 69b and 75b of the shift forks 69 and 75 and the peripheral walls of the central grooves 73a and 74a in the shift sleeves 73 and 74.

To solve this problem, end mill machining (second end mill machining) at least at the bent section of each bent portion BP is additionally performed in such a manner that the curvature radius of the inner wall on the inner side is closer to the curvature radius of the inner wall on the outer side. The additional second end mill machining makes the ratio between the curvature radius of the inner wall on the outer side and the curvature radius of the inner wall on the inner side of the bent section substantially 2 or less, preferably 1.9 to 1.5. For example, if the curvature radius of the inner wall on the outer side is 11 mm, the curvature radius of the inner wall on the inner side is set to 5.5 to 7 mm, preferably 6 mm.

Next, the switching of the gears will be described in detail with reference to FIGS. 3 and 4. Upon moving the gear change operation tool 19 to the forward first-speed position, the shift drum 9 rotates, the first shift fork 69 slides the first shift sleeve 73 toward the forward first-speed driven gear 60, and the first shift sleeve 73 joins the forward first-speed driven gear 60 to the first boss member 64 (variable speed shaft 51) in an interlocking manner. Here, the second shift sleeve 74 is not joined to the forward second-speed driven gear 61 in an interlocking manner. This causes the speed change gearbox 30 to output forward first-speed motive power. Pressing the accelerator pedal in this state causes the traveling body to travel at the forward first speed.

Upon moving the gear change operation tool 19 to the forward second-speed position, the shift drum 9 rotates, the second shift fork 75 slides the second shift sleeve 74 toward the forward second-speed driven gear 61, and the second shift sleeve 74 joins the forward second-speed driven gear 61 to the second boss member 66 (variable speed shaft 51) in an interlocking manner. Here, the first shift sleeve 73 is not joined to the forward first-speed driven gear 60 or the reverse driven gear 62 in an interlocking manner. This causes the speed change gearbox 30 to output forward second-speed motive power. Pressing the accelerator pedal 20 in this state causes the traveling body to travel at the forward second speed.

Upon moving the gear change operation tool 19 to the reverse position, the shift drum 9 rotates, the first shift fork 69 slides the first shift sleeve 73 toward the reverse driven gear 62, and the first shift sleeve 73 joins the reverse driven gear 62 to the first boss member 64 (variable speed shaft 51) in an interlocking manner. Here, the second shift sleeve 74 is not joined to the forward second-speed driven gear 61 in an interlocking manner. This causes the transmission 24 to output reverse motive power. Pressing the accelerator pedal 20 in this state causes the traveling body to reverse.

OTHER EMBODIMENTS (1) In the above embodiment, the gear change operation tool 19 and the shift drum 9 of the speed change gearbox 30 are mechanically joined by the interlocking mechanism 79, such as a link mechanism, in such a manner that displacement operation can be transferred. However, a by-wire system can alternatively be used. In the case of using a by-wire system, a drive signal is transmitted to an actuator of the shift drum 9 based on a detection signal from an operation detector that detects an operation amount of the gear change operation tool 19, thus rotating the shift drum 9 and switching the gears.

(2) The shifter of the above embodiment has a configuration where the shift forks 69 and 75 are joined to and engage with the central grooves 73a and 74a in the respective shift sleeves 73 and 74, but this need not be the case. For example, the shift sleeves 73 and 74 may alternatively be integrated with the respective shift forks 69 and 75. Further, each shifter may be a further dividable component.

(3) Although the above embodiment employs the belt-type continuously variable mechanism 29, a hydraulic continuously variable mechanism may alternatively be employed, or a simple main clutch mechanism may be employed while omitting a continuously variable mechanism.

(4) The traveling devices of the above embodiment include the pair of left and right front wheels 11 and the pair of left and right rear wheels 12, but the multipurpose vehicle may be of a three-wheel or two-wheel type.

INDUSTRIAL APPLICABILITY

The present invention can be applied to a traveling vehicle that includes a speed change gearbox in which gears are switched with use of a shift drum.

DESCRIPTION OF REFERENCE SIGNS

9: Shift drum
9a: Shaft
19: Gear change operation tool
29: Belt-type continuously variable mechanism
30: Speed change gearbox
51: Variable speed shaft
52: Relay shaft 53: Transfer shaft
54: Forward first-speed gear mechanism (gear)
56: Forward second-speed gear mechanism (gear)
58: Reverse gear mechanism (gear)
69: First shift fork (shift fork)
69a: Cam pin
69b: Fork portion
79: Interlocking mechanism
90: Guide groove
91: First guide groove
92: Second guide groove
BP: Bent portion
PR: Rotation axis
S1: First shifter
S2: Second shifter
X: Axial direction

What is claimed is:

1. A transmission for a traveling vehicle, comprising:
a gear change operation tool;
a shift drum configured to rotate in response to an operation of the gear change operation tool and having at least one bent guide groove disposed in a surface of the shift drum and extending in a circumferential direction of the surface of the shift drum;
at least one shifter having a cam pin in the at least one guide groove and configured to be moved by a movement of the cam pin following the rotation of the shift drum; and
a speed change gearbox comprising gears configured to be switched by the movement of the shifter,
wherein the at least one guide groove includes a bent section formed by (i) first end mill machining performed in a direction in which the at least one guide groove extends, with use of an end mill having a diameter corresponding to a width of the guide groove, and (ii) second end mill machining performed in the direction in which the at least one guide groove extends, in such a manner as to increase a curvature radius of an inner wall on an inner side, the inner wall having been formed by the first end mill machining, and
wherein the bent section further has an inner wall on an outer side and a ratio between a curvature radius of the inner wall on the outer side and the curvature radius of the inner wall on the inner side is 2 to 1.5.

2. The transmission according to claim 1, wherein:
the at least one shifter comprises a first shifter and a second shifter,
the at least one guide groove includes:
a first guide groove in which a cam pin of the first shifter is disposed; and
a second guide groove in which a cam pin of the second shifter is disposed, and
the gears of the speed change gearbox are switched due to positions of the first shifter and the second shifter being determined by a rotation angle of the shift drum.

* * * * *